United States Patent
Kerner et al.

(10) Patent No.: US 10,477,476 B2
(45) Date of Patent: Nov. 12, 2019

(54) DEVICE AND METHOD TO REDUCE POWER AMPLIFIER POWER CONSUMPTION

(71) Applicant: Intel IP Corporation, Santa Clara, CA (US)

(72) Inventors: Michael Kerner, Tel Mond (IL); Uri Perlmutter, Holon (IL); Avishay Friedman, Petach Tikva (IL); Rotem Banin, Even-Yehuda (IL); Tzvi Maimon, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 122 days.

(21) Appl. No.: 15/280,350

(22) Filed: Sep. 29, 2016

(65) Prior Publication Data

US 2018/0092037 A1 Mar. 29, 2018

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0007* (2013.01); *H04L 27/2614* (2013.01);
(Continued)

(58) Field of Classification Search
CPC ............. H04W 52/0235; H04W 76/27; H04W 76/046; H04L 5/0007
See application file for complete search history.

(56) References Cited

U.S. PATENT DOCUMENTS

| | | |
|---|---|---|
| 2007/0232246 A1 | 10/2007 | Lozhkin et al. |
| 2009/0052561 A1* | 2/2009 | Baxley ............. H04B 1/59 375/260 |

(Continued)

FOREIGN PATENT DOCUMENTS

| | | |
|---|---|---|
| EP | 2472718 | 7/2012 |
| WO | 2008141510 | 11/2008 |
| WO | 2016071888 | 5/2016 |

OTHER PUBLICATIONS

Jiang, Tao, "An Overview: Peak-to-Average Power Ratio Reduction Techniques for OFDM Signals", IEEE Transactions on Broadcasting vol. 54, No. 2, (Jun. 2008), 257-268.
(Continued)

*Primary Examiner* — Jeffrey M Rutkowski
*Assistant Examiner* — Chae S Lee
(74) *Attorney, Agent, or Firm* — Schwegman Lundberg & Woessner, P.A.

(57) ABSTRACT

A wireless device and method of power consumption reduction are generally described herein. The wireless device may map a plurality of data symbols to sub-carriers for an orthogonal frequency division multiplexing (OFDM) transmission. The wireless device may divide the plurality of data symbols into first and second groups of data symbols. The wireless device may generate a first OFDM signal from the first group of data symbols for amplification by a first power amplifier (PA). The wireless device may generate a second OFDM signal from the second group of data symbols for amplification by a second PA. The data symbols of the first and second groups may be selected to provide a PAPR of the first OFDM signal that is lower than a PAPR of a composite OFDM signal based on the plurality of data symbols.

21 Claims, 7 Drawing Sheets

(51) Int. Cl.
*H04W 76/27* (2018.01)
*H04L 27/26* (2006.01)

(52) U.S. Cl.
CPC ............ *H04W 76/27* (2018.02); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01); *Y02D 70/25* (2018.01); *Y02D 70/26* (2018.01)

(56) References Cited

U.S. PATENT DOCUMENTS

| | | | |
|---|---|---|---|
| 2010/0091900 A1* | 4/2010 | Gan | H04L 27/2614 375/267 |
| 2010/0177832 A1* | 7/2010 | Baliga | H04L 27/2614 375/260 |
| 2015/0146806 A1* | 5/2015 | Terry | H04L 25/0204 375/260 |
| 2017/0180053 A1* | 6/2017 | Lozhkin | H04B 10/564 |

OTHER PUBLICATIONS

Li, X., "Effects of Clipping and Filtering on the Performance of OFDM", IEEE Communications Letters, 2(5), (May 1998), 131-133.

"International Application Serial No. PCT/US2017/049053, International Search Report dated Dec. 13, 2017", 3 pgs.

"International Application Serial No. PCT/US2017/049053, Written Opinion dated Dec. 13, 2017", 9 pgs.

* cited by examiner

DEVICE AND METHOD TO REDUCE POWER AMPLIFIER POWER CONSUMPTION

TECHNICAL FIELD

Some aspects of present disclosure pertain to peak-to-average power ratio (PAPR) reduction. Some aspects of present disclosure relate to power consumption of one or more power amplifiers. Some aspects of present disclosure relate to wireless devices. Some aspects of present disclosure relate to orthogonal frequency division multiplexing (OFDM) signals.

BACKGROUND

Wireless devices may exchange various signals with other devices, such as data signals, control signals or other signals. As an example, a baseband signal may be input to a power amplifier (PA) before up-conversion to a radio frequency (RE) range for transmission. A power consumption of the PA may be a significant contributor to overall power consumption of the wireless device, in some cases. As an example, an orthogonal frequency division multiplexing (OFDM) signal may exhibit a high peak-to-average power ratio (PAPR), which may cause a high power consumption of the PA. Accordingly, there is a need for methods and systems to reduce and/or control power consumption of wireless devices in these and other scenarios.

DETAILED DESCRIPTION

The following description and the drawings sufficiently illustrate specific aspects of present disclosure to enable those skilled in the art to practice them. Other aspects of present disclosure may incorporate structural, logical, electrical, process, and other changes. Portions and features of some aspects of present disclosure may be included in, or substituted for, those of other aspects of present disclosure. Aspects of present disclosure set forth in the claims encompass all available equivalents of those claims.

Figure 1:
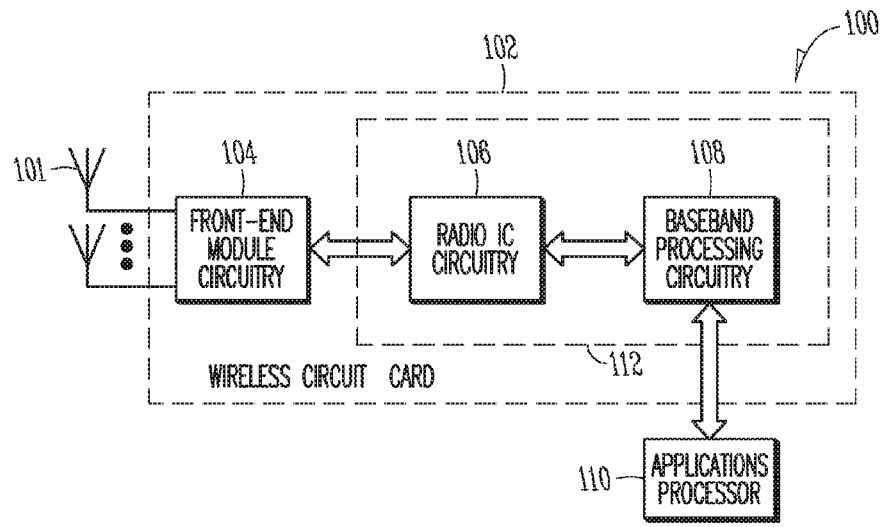
FIG. 1 is a block diagram of a radio architecture in accordance with some aspects of present disclosure.

FIG. 1 is a block diagram of a radio architecture 100 in accordance with some aspects of present disclosure. In some aspects of present disclosure, some or all of the techniques or operations described herein may be applicable to the radio architecture 100 or other radio architectures. Some or all of the techniques described herein may be applicable to communication devices or other devices that may include a radio architecture such as 100 or other. However, the scope of aspects of present disclosure is not limited in this respect, as some or all of the techniques or operations described herein may be applicable to other devices or architectures, in some aspects of present disclosure. In some aspects of present disclosure, some or all of the techniques or operations described herein may be applicable to devices or architectures that may not necessarily be related to a radio architecture or communication device.

Referring to FIG. 1, the radio architecture 100 may include front-end module circuitry 104, radio IC circuitry 106 and baseband processing circuitry 108. Front-end module circuitry 104 may include a receive signal path which may include circuitry configured to operate on RF signals received from one or more antennas 101, amplify the received signals and provide the amplified versions of the received signals to the radio IC circuitry 106 for further processing. Front-end module circuitry 104 may also include a transmit signal path which may include circuitry configured to amplify signals for transmission provided by the radio IC circuitry 106 for transmission by one or more of the antennas 101.

Radio IC circuitry 106 may include a receive signal path which may include circuitry to down-convert RF signals received from the front-end module circuitry 104 and provide baseband signals to the baseband processing circuitry 108. Radio IC circuitry 106 may also include a transmit signal path which may include circuitry to up-convert baseband signals provided by the baseband processing circuitry 108 and provide RF output signals to the front-end module circuitry 104 for subsequent transmission.

Baseband processing circuitry 108 may include one or more processors and control logic to process the baseband signals received from the receive signal path of the radio IC circuitry 106 and to generate the baseband signals for the transmit signal path of the radio IC circuitry 106. Baseband processing circuitry 108 may interface with applications processor 110 for generation and processing of the baseband signals and for controlling operations of the radio IC circuitry 106.

In some aspects of present disclosure, the antennas 101, the front-end module circuitry 104, the radio IC circuitry 106, and baseband processing circuitry 108 may be provided on a single circuit card, such as wireless circuit card 102, although the scope of the aspects of present disclosure is not limited in this respect. In some other aspects of present disclosure, the antennas 101, the front-end module circuitry 104 and the radio IC circuitry 106 may be provided on a single circuit card. In some aspects of present disclosure, the radio IC circuitry 106 and the baseband processing circuitry 108 may be provided on a single chip or integrated circuit (IC), such as IC 112, although the scope of the aspects of present disclosure is not limited in this respect.

Figure 2:
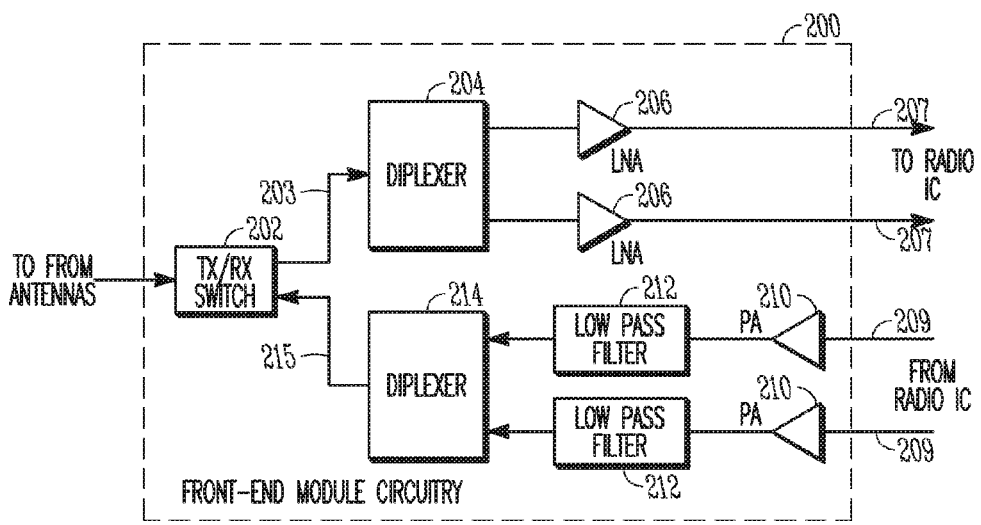
FIG. 2 illustrates front-end module circuitry in accordance with some aspects of present disclosure.

FIG. 2 illustrates front-end module circuitry 200 in accordance with some aspects of present disclosure. The front-end module circuitry 200 is one example of circuitry that may be suitable for use as the front-end module circuitry 104 (FIG. 1), although other circuitry configurations may also be suitable. In some aspects of present disclosure, the front-end module circuitry 200 may include a TX/RX switch 202 to switch between transmit mode and receive mode operation. The front-end module circuitry 200 may include a receive signal path and a transmit signal path. The receive signal path of the front-end module circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the front-end module circuitry 200 may include one or more power amplifiers (PAs) 210 to amplify input RF signals 209 (e.g., provided by the radio IC circuitry 106), and one or more filters 212 to generate RE signals 215 for subsequent transmission (e.g., by one or more of the antennas 101 (FIG. 1)).

It should be noted that the front-end module circuitry 200 may include one or more additional components, in some aspects of present disclosure. In addition, one or more components of the front-end module circuitry 200 may be arranged differently than shown in FIG. 2, in some aspects of present disclosure.

In some aspects of present disclosure, the front-end module circuitry 200 may be configured to operate in multiple frequency bands. As a non-limiting example, either the 2.4 GHz frequency spectrum or the 5 GHz frequency spectrum may be used. As another example, more than two frequency bands may be used. In these aspects of present disclosure, the receive signal path of the front-end module circuitry 200 may include a receive signal path diplexer 204 to separate the signals from each spectrum as well as a separate LNA 206 for each spectrum. In these aspects of present disclosure, the transmit signal path of the front-end module circuitry 200 may also include a power amplifier 210 and a filter 212 for each frequency spectrum and a transmit signal path diplexer 214 to provide the signals of one of the different spectrums onto a single transmit path for subsequent transmission by the one or more of the antennas 101 (FIG. 1). These aspects of present disclosure are not limiting, however, as the front-end module circuitry 200 may be configured to operate in one frequency band, in some cases.

It should be noted that aspects of present disclosure are not limited to PAs included in external front-end module circuitry. In some aspects of present disclosure, one or more internal PAs integrated in silicon may be used. As a non-limiting example, one or more internal PAs may be integrated in silicon in other circuitry/components of a device, including but not limited to the radio architecture 100.

Figure 3:
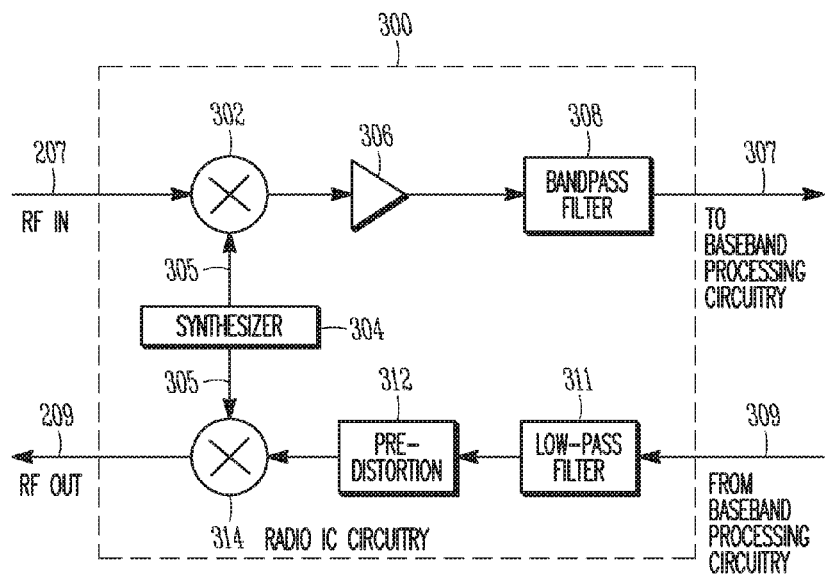
FIG. 3 illustrates radio IC circuitry in accordance with some aspects of present disclosure.

FIG. 3 illustrates radio IC circuitry 300 in accordance with some aspects of present disclosure. The radio IC circuitry 300 is one example of circuitry that may be suitable for use as the radio IC circuitry 106 (FIG. 1), although other circuitry configurations may also be suitable. In some aspects of present disclosure, radio IC circuitry may include one or more components shown in the example radio IC circuitry 300. In some aspects of present disclosure, radio IC circuitry may include one or more additional components. In some aspects of present disclosure, radio IC circuitry may not necessarily include all components shown in the example radio IC circuitry 300.

In some aspects of present disclosure, the radio IC circuitry 300 may include a receive signal path and a transmit signal path. The receive signal path of the radio IC circuitry 300 may include at least mixer circuitry 302, amplifier circuitry 306 and filter circuitry 308. The transmit signal path of the radio IC circuitry 300 may include at least one filter circuitry 311 and mixer circuitry 314. The transmit signal path may also include pre-distortion circuitry 312, in some aspects of present disclosure. Radio IC circuitry 300 may also include synthesizer circuitry 304 for synthesizing a frequency 305 for use by the mixer circuitry 302 and/or the mixer circuitry 314.

In some aspects of present disclosure, mixer circuitry 302 may be configured to down-convert RF signals 207 received from the front-end module circuitry 104 (FIG. 1) based on the synthesized frequency 305 provided by synthesizer circuitry 304. The amplifier circuitry 306 may be configured to amplify the down-converted signals and the filter circuitry 308 may be a band-pass filter (BPF) configured to remove unwanted signals from the down-converted signals to generate output baseband signals 307. Output baseband signals 307 may be provided to the baseband processing circuitry 108 (FIG. 1) for further processing. In some aspects of present disclosure, the output baseband signals 307 may be zero-frequency baseband signals, although this is not a requirement. In some aspects of present disclosure, mixer circuitry 302 may comprise passive mixers, although the scope of the aspects of present disclosure is not limited in this respect.

In some aspects of present disclosure, the mixer circuitry 314 may be configured to up-convert input baseband signals 309 based on the synthesized frequency 305 provided by the synthesizer circuitry 304 to generate RF output signals 209 for the front-end module circuitry 104. The baseband signals 309 may be provided by the baseband processing circuitry 108 and may be processed by one or more of the filter circuitry 311 and/or pre-distortion circuitry 312. The filter circuitry 311 may include a low-pass filter (LPF), although the scope of the aspects of present disclosure is not limited in this respect.

In some aspects of present disclosure, the output baseband signals 307 and the input baseband signals 309 may be analog baseband signals, although the scope of the aspects of present disclosure is not limited in this respect. In some alternate aspects of present disclosure, the output baseband signals 307 and the input baseband signals 309 may be digital baseband signals. In these alternate aspects of present disclosure, the radio IC circuitry may include analog-to-digital converter (ADC) and digital-to-analog converter (DAC) circuitry. In some dual-mode aspects of present disclosure, a separate radio IC circuitry may be provided for processing signals for each spectrum, although the scope of the aspects of present disclosure is not limited in this respect.

Figure 4:
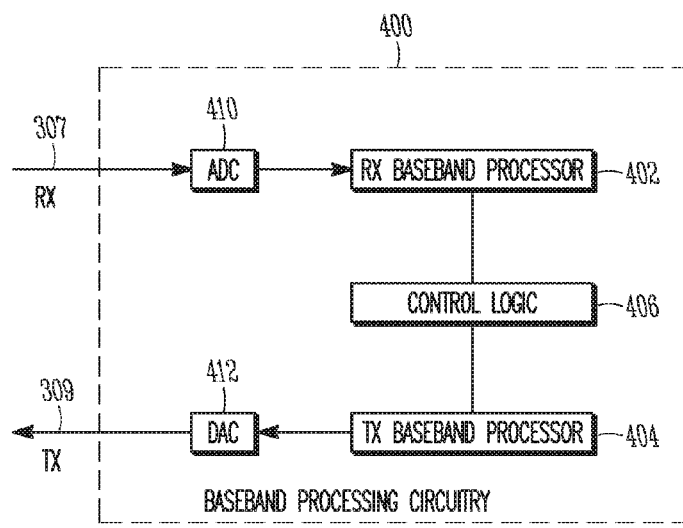
FIG. 4 illustrates a functional block diagram of baseband processing circuitry in accordance with some aspects of present disclosure.

FIG. 4 illustrates a functional block diagram of baseband processing circuitry 400 in accordance with some aspects of present disclosure. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 307 provided by the radio IC circuitry 106 (FIG. 1) and a transmit baseband processor (TX BBP) 404 for generating transmit baseband signals 309 for the radio IC circuitry 106. The baseband processing circuitry 400 may also include control logic 406 for coordinating the operations with the baseband processing circuitry 400.

In some aspects of present disclosure (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these aspects of present disclosure, the baseband processing circuitry 400 may also include DAC 412 to convert digital baseband signals from the TX BBP 504 to analog baseband signals.

Referring to FIG. 1, in some aspects of present disclosure, the antennas 101 (FIG. 1) may comprise one or more directional or omnidirectional antennas, including, for example, dipole antennas, monopole antennas, patch antennas, loop antennas, micro-strip antennas or other types of antennas suitable for transmission of RF signals. In some multiple-input multiple-output (MIMO) aspects of present disclosure, the antennas may be effectively separated to take advantage of spatial diversity and the different channel characteristics that may result.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects of present disclosure, the functional elements may refer to one or more processes operating on one or more processing elements.

In some aspects of present disclosure, the radio architecture 100 may be part of a communication device such as a wireless local area network (WLAN) communication station (STA), a wireless access point (AP), user equipment WE), an Evolved Node-B (eNB), a base station or a mobile device including a Wireless Fidelity (Wi-Fi) device. In some of these aspects of present disclosure, radio architecture 100 may be configured to transmit and receive signals in accordance with specific communication standards, such as one or more Institute of Electrical and Electronics Engineers (IEEE) standards, including but not limited to various IEEE 802.11 standards. Such standards may include, but are not limited to IEEE 802.11-2012, 802.11n-2009, 802.11ac, and/or 802.11 ax standards and/or proposed specifications for WLANs. In some aspects of present disclosure, radio architecture 100 may be configured to transmit and receive signals in accordance with Third Generation Partnership Project (3GPP) standards including Long Term Evolution (LTE) standards. The scope of the aspects of present disclosure is not limited in this respect, however, as the radio architecture 100 may also be suitable to transmit and/or receive communications in accordance with other techniques and standards. In addition, the radio architecture 100 may be configured to transmit and receive signals in multiple frequency bands in some aspects of present disclosure.

In some aspects of present disclosure, the radio architecture 100 may be part of a communication device such as a personal digital assistant (PDA), a laptop or portable computer with wireless communication capability, a web tablet, a wireless telephone, a smart-phone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some aspects of present disclosure, the communication device may include one or more of a keyboard, a display, a non-volatile memory port, multiple antennas, a graphics processor, an application processor, speakers, and other mobile device elements. The display may be an LCD screen including a touch screen In some aspects of present disclosure, the communication device may be or may be configured to operate as a mobile device and/or a stationary non-mobile device. As an example, the communication device may be an AP or an STA. In some aspects of present disclosure, the communication device may also be, or may be part of, an apparatus for such a device. As an example, an STA may include the communication device in addition to other equipment, components or elements. As another example, an AP may include the communication device in addition to other equipment, components or elements. It should also be noted that some aspects of present disclosure may be related to other electrical devices, electrical circuits or other devices that may or may not be related to communication.

Figure 5:
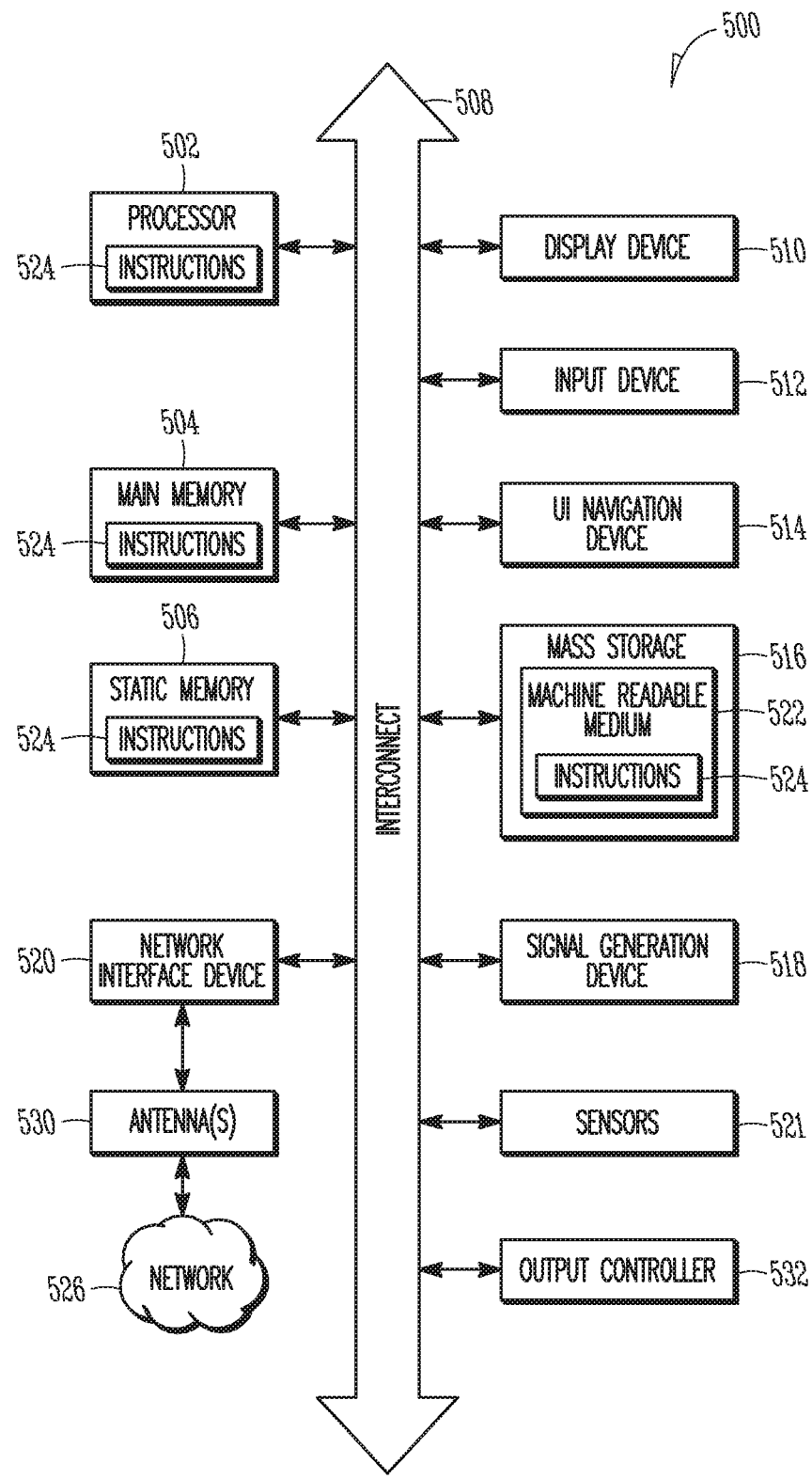
FIG. 5 illustrates a block diagram of an example machine in accordance with some aspects of present disclosure.

FIG. 5 illustrates a block diagram of an example machine in accordance with some aspects of present disclosure. The machine 500 is an example machine upon which any one or more of the techniques and/or methodologies discussed herein may be performed. In alternative aspects of present disclosure, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be an access point (AP), station (STA), User Equipment (UE), Evolved Node-B (eNB), wireless device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UT) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB)), parallel, or other wired or wireless (e.g., infrared (IR), near field communication (NFC), etc.) connection to communicate or control one or more peripheral devices (e.g., printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media. In some aspects of present disclosure, the machine readable medium may be or may include a non-transitory computer-readable storage medium. In some aspects of present disclosure, the machine readable medium may be or may include a computer-readable storage medium.

While the machine readable medium 522 is illustrated as a single medium, the term "machine readable medium" may include a single medium or multiple media (e.g., a centralized or distributed database, and/or associated caches and servers) configured to store the one or more instructions 524. The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (LAN), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

In accordance with some aspects of present disclosure, a wireless device 100 may map a plurality of data symbols to sub-carriers for an orthogonal frequency division multiplexing (OFDM) transmission. The wireless device 100 may divide the plurality of data symbols into a first group of data symbols and a second group of data symbols. The wireless device 100 may generate a first OFDM signal from the first group of data symbols for amplification by a first power amplifier (PA). The wireless device 100 may generate a second OFDM signal from the second group of data symbols for amplification by a second PA. The data symbols of the first and second groups may be selected to provide a PAPR of the first OFDM signal that is lower than a reference PAPR of a composite OFDM signal based on the first and second groups of data symbols. These aspects of present disclosure will be described in more detail below.

Figure 6:
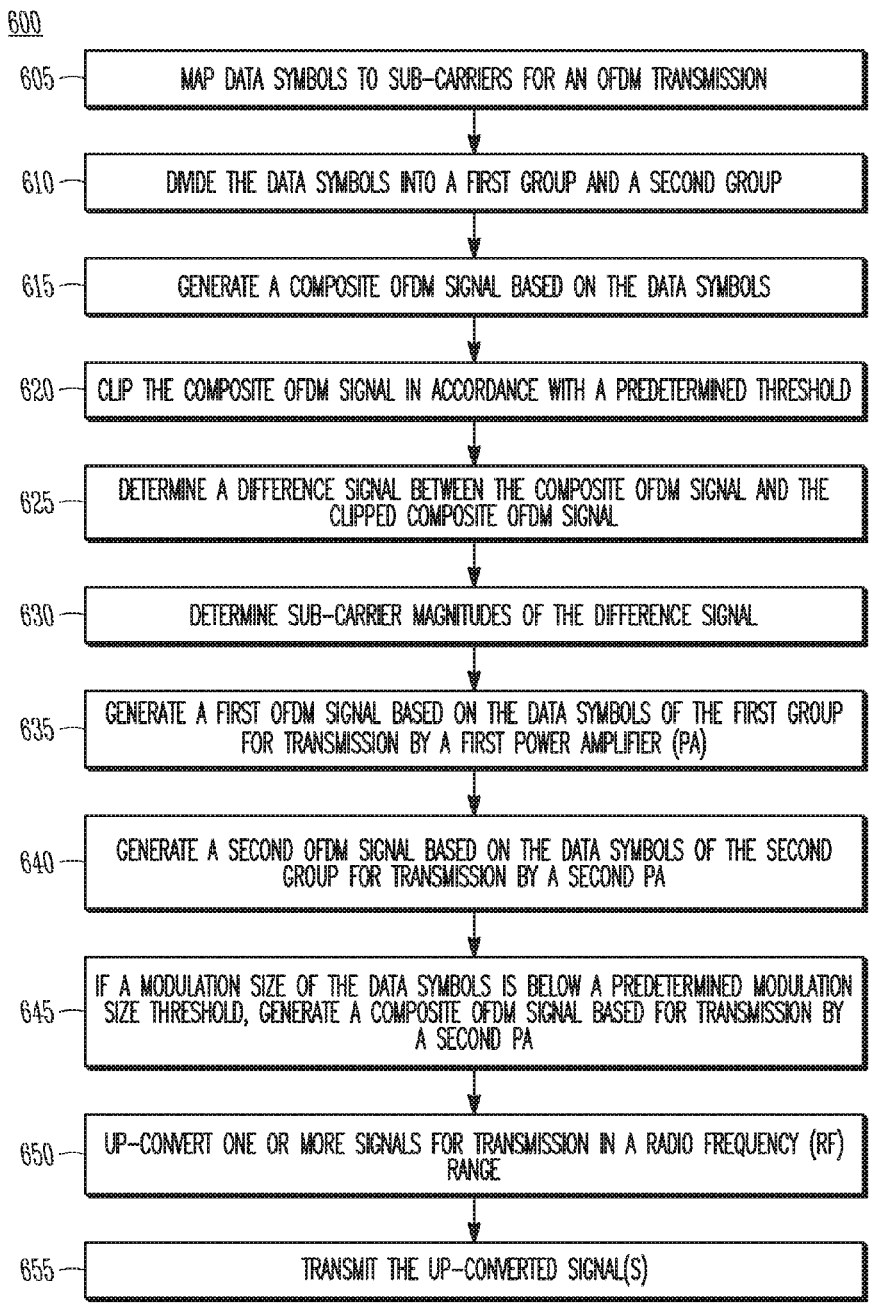
FIG. 6 illustrates the operation of an example method in accordance with some aspects of present disclosure.

FIG. 6 illustrates the operation of an example method in accordance with some aspects of present disclosure. It is important to note that aspects of present disclosure of the method 600 may include additional or even fewer operations or processes in comparison to what is illustrated in FIG. 6. In addition, aspects of present disclosure of the method 600 are not necessarily limited to the chronological order that is shown in FIG. 6. In describing the method 600, reference may be made to FIGS. 1-5 and 7-8, although it is understood that the method 600 may be practiced with any other suitable systems, interfaces and components. In some aspects of present disclosure, one or more operations of the method 600 may be practiced by a wireless device configured to operate in accordance with one or more protocols/standards, including but not limited to IEEE 802.11, Wi-Fi, wireless local area network (WLAN), Third Generation Partnership Project (3GPP), 3GPP Long Term Evolution (LTE) and/or other. Accordingly, the device may be station (STA), access point (AP), Evolved Node-B (eNB), User Equipment (UE) and/or other suitable device, in some aspects of present disclosure. It should be noted that aspects of present disclosure are not limited to wireless devices configured to operate in accordance with one or more standards, however.

In some aspects of present disclosure, one or more operations described herein (including but not limited to operations of the method 600) may be performed by processing circuitry such as the transmit baseband processor 404, the baseband processor 108, 400, any of the components of the machine 500 and/or other components. References to processing circuitry in descriptions of the operations are not limiting, however.

Figure 7:
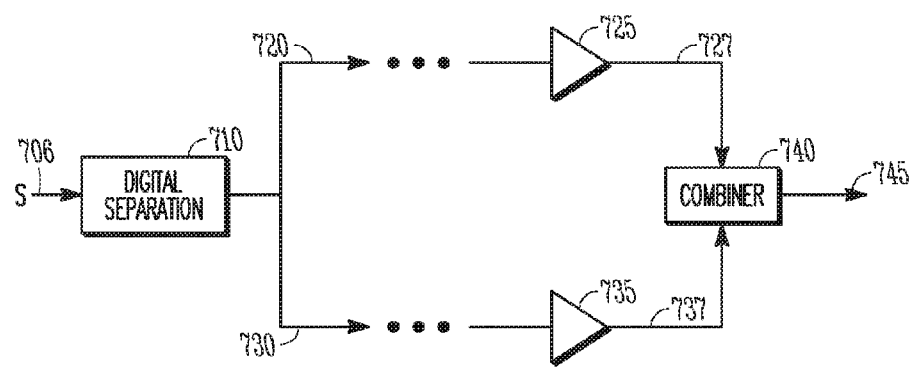
FIG. 7 illustrates example circuitry in accordance with some aspects of present disclosure.

FIG. 7 illustrates example circuitry in accordance with some aspects of present disclosure. In some aspects of present disclosure, the example circuitry 700 may be included in a device, such as those described herein and/or other devices. It should be noted that concepts, methods (such as 600 and/or others), operations and/or techniques may be described in terms of the example circuitry 700 in FIG. 7, but such descriptions are not limiting. In addition, one or more components of the example circuitry 700 (or one or more components of it) may be combined with one or more components from any of FIGS. 1-5. As an example, the power amplifiers (PAs) 725, 735 may be include in the front-end module circuitry 200 in some aspects of present disclosure. As another example, the digital separation module 710 may be performed by and/or implemented in processing circuitry such as the transmit baseband processor 404, the baseband processor 108, 400, any of the components of the machine 500 and/or other components.

It should be noted that aspects of present disclosure are not limited by the number, type or arrangement of components shown in the example circuitry 700 in FIG. 7. Some aspects of present disclosure may include additional components or alternate components, including but not limited to one or more of those shown in any of FIGS. 1-5. As an example, one or more components may be used to up-convert the signals 720, 730 from a baseband frequency range to an RF range. Some aspects of present disclosure may not necessarily include all components shown in the example circuitry 700 shown in FIG. 7. Some aspects of present disclosure may include components in an arrangement that may be different from the example circuitry 700 shown in FIG. 7.

In some aspects of present disclosure, an output from a first component may be input to a second component. In some cases, the first and second components may be connected directly, such as through a wired connection, in which case the output from the first component may be input directly to the second component. In some cases, the first and second components may not necessarily be connected directly. For instance, one or more other components may be included in a path between the first and second components. Accordingly, the output from the first component may be affected, in some cases, by one or more other components before being input to the second component. In such cases, the second component may receive the output from the first component indirectly. As an example, a filter may be included between the first and second components. It is understood that references to signals, inputs and/or outputs exchanged between components may include direct or indirect exchanges, in some aspects of present disclosure.

At operation 605 of the method 600, the wireless device 100 may map a plurality of data symbols to sub-carriers for an orthogonal frequency division multiplexing (OFDM) transmission. In some aspects of present disclosure, the plurality of data symbols may be mapped to the sub-carriers in accordance with a predetermined mapping. In some aspects of present disclosure, the sub-carriers may comprise a predetermined sub-carrier bandwidth. In some aspects of present disclosure, the sub-carriers may be orthogonal.

It should be noted that references herein to OFDM transmission and/or OFDM signals are not limiting. In some aspects of present disclosure, other types of modulation/multiple access may be used. Other suitable types of multiplexed transmission and/or multiplexed signals may be used. As an example, single-carrier frequency division multiple access (SC-FDMA) transmission and/or SC-FDMA signals may be used. Accordingly, although one or more operations, methods and/or techniques may be described herein in terms of OFDM transmission and/or OFDM signals, it is understood that one or more of those operations, methods and/or techniques may be applicable to other types of multiplexed transmissions and/or multiplexed signals, in some aspects of present disclosure.

Any suitable data symbols may be used. In some aspects of present disclosure, a baseband processor (such as 404) and/or other component may generate the plurality of data symbols, although the scope of aspects of present disclosure is not limited in this respect. As a non-limiting example, the data symbols may be based on a group of data bits. Accordingly, one or more encode/transmit functions, such as error correction coding, interleaving, bit-to-symbol mapping and/or others, may be used to generate the data symbols from the group of bits.

At operation 610, the wireless device 100 may divide the plurality of data symbols into a first group of data symbols and a second group of data symbols. Any suitable technique may be used to divide the plurality of data symbols, examples of which will be presented below. In some aspects of present disclosure, the data symbols of the first and second groups may be selected to provide a lower PAPR of a first OFDM signal (generated from the data symbols of the first group) than a second OFDM signal (generated from the data symbols of the second group). In some aspects of present disclosure, the data symbols of the first and second groups may be selected to provide a lower PAPR of the first OFDM signal than a composite OFDM signal generated from the data symbols of both the first and second groups.

Referring to FIG. 7, the plurality of data symbols 705 (labeled as S) may be separated by the digital separation module 710 to generate the first and second groups of data symbols, which may be used to generate the first OFDM signal 720 and the second OFDM signal 730. The first OFDM signal 720 may be amplified by the first PA 725 to generate the output signal 727. The second OFDM signal 730 may be amplified by the second PA 735 to generate the output signal 737. The output signals 727 and 737 may be combined by the combiner 740 to generate the output 745. In some aspects of present disclosure, the first OFDM signal 720 and the second OFDM signal 730 may be baseband signals generated for the amplifications, by the first and second PAs 725, 735, in a radio frequency (RF) range. It should be noted that the first and second OFDM signals 720, 730 are not limited to baseband signals, as they may be RF signals, in some aspects of present disclosure.

In some cases, the division of the plurality of data symbols into the first and second groups of data symbols may reduce a sum of power consumptions of the first PA 725 and the second. PA 735 in comparison to a reference power consumption. The reference power consumption may be based on amplification, by the second PA 735, of a composite OFDM signal that is based on the plurality of data symbols (such as S in FIG. 7, the plurality of data symbols before the division).

In some aspects of present disclosure, the first and second OFDM signals may be generated using an inverse Fourier Transform (FT), inverse fast Fourier Transform (IFFT) and/or other suitable technique. As an example, the first OFDM signal may be generated by mapping the plurality of data symbols to the sub-carriers in accordance with the predetermined mapping, setting values of the sub-carriers to which the data symbols of the second group are mapped to zero, and performing an IFFT. The second OFDM signal may be generated by mapping the plurality of data symbols to the sub-carriers in accordance with the predetermined mapping, setting values of the sub-carriers to which the data symbols of the first group are mapped to zero, and performing an IFFT. It should also be noted that one or more sub-carriers may be allocated for pilot symbols, may be allocated as part of a guard-band or may be allocated as a direct current (DC) sub-carrier. The sub-carriers allocated for the guard-band or DC sub-carrier may be set to a value of zero in operations such as the IFFT, inverse FT and/or others, in some cases. These techniques may be applied for generation of other OFDM signals, in some cases.

In an example of division of the plurality of data symbols into the first and second groups of data symbols, different candidate divisions may be generated by the wireless device 100, in which each candidate division may include a candidate first group of data symbols and a candidate second group of data symbols. The candidate divisions may be generated randomly, pseudo-randomly or in accordance with another suitable technique. Any suitable number of candidate divisions may be generated. The wireless device 100 may, for each of the candidate divisions, determine a candidate first PAPR of a candidate first OFDM signal based on the candidate first group of data symbols. The wireless device 100 may select the first group of data symbols and the second group of data symbols as the candidate first group and the candidate second group for which the candidate first PAPR is minimized (within the group of candidate first PAPRs that are determined).

In another example of division of the plurality of data symbols into the first and second groups of data symbols, one or more of operations 615-630 may be performed. As described previously, some aspects of present disclosure of the method 600 may not necessarily include all operations shown in FIG. 6. Accordingly, when other techniques are used for the division of the plurality of data symbols into the first and second groups of data symbols, one or more of operations 615-630 may not necessarily be included.

At operation 615, the wireless device 100 may generate a composite OFDM signal based on the plurality of data symbols (that is, the data symbols that are to be divided into the first and second groups of data symbols). As an example, an inverse FT, IFFT or other technique may be used.

At operation 620, the wireless device 100 may clip the composite OFDM signal in accordance with a predetermined threshold. Any suitable technique may be used to clip the composite OFDM signal. As an example, a hard clip operation may restrict power levels and/or amplitudes of the composite OFDM signal to a clip range to generate the clipped composite OFDM signal. As another example, the composite OFDM signal may be clipped in accordance with a fixed output gain for signal amplitudes below a predetermined threshold and a fixed output power for signal amplitudes above the threshold. That is, values of the signal amplitude that are below the threshold may be unchanged (or multiplied by a fixed gain) in the clipped signal and values of the signal amplitude that are higher than the threshold may be limited to a fixed output level in the clipped signal. Aspects of present disclosure are not limited to usage of a clip operation or to these examples, as other operations that limit/restrict peaks of the signal may be used in some cases, including but not limited to soft clippers or limiters.

At operation 625, the wireless device 100 may determine a difference signal between the OFDM signal and the clipped OFDM signal. At operation 630, the wireless device 100 may determine sub-carrier magnitudes of the difference signal. In some aspects of present disclosure, a Fourier Transform (FT), fast Fourier Transform (FFT) or other technique may be used.

Accordingly, in this example of division into the first and second groups of data symbols, the data symbols of the first and second groups may be determined based at least partly on the sub-carrier magnitudes of the difference signal. As an example, one or more of the data sub-carriers mapped to sub-carriers for which the sub-carrier magnitudes of the difference signal are in a high range (such as the top portion of the magnitudes sorted). As another example, the second group of data symbols may include a predetermined number of the plurality of data symbols, the first group of data symbols may include the data symbols of the plurality of data symbols that are not included in the second group of data symbols, and the sub-carrier magnitudes mapped to the data symbols of the second group may be higher than the sub-carrier magnitudes mapped to the data symbols of the first group. As another example, the second group of data symbols may include a predetermined number of the plurality of data symbols, the first group of data symbols may include one or more data symbols of the plurality of data symbols different from the data symbols of the second group, and the sub-carrier magnitudes mapped to the data symbols of the second group may be higher than the sub-carrier magnitudes mapped to the data symbols of the first group Another example of division of the plurality of data symbols into the first and second groups of data symbols is presented below. As described previously, some aspects of present disclosure of the method 600 may not necessarily include all operations shown in FIG. 6. When the plurality of data symbols is divided in accordance with this example, one or more of operations 615-630 may be excluded, modified and/or replaced by alternate operation(s). The wireless device 100 may initialize the second group of data symbols to an empty group and may initialize the first group of data symbols to include the plurality of data symbols. For each of a predetermined number of iterations, the wireless device 100 may perform the following operations: generate a first set of sub-carrier values (wherein values of the sub-carriers mapped to the data symbols of the second group are set to zero and values of the sub-carriers mapped to the data symbols of the first group are set to the corresponding data symbols); generate a first OFDM signal based on the first set of sub-carrier values; clip the first OFDM signal in accordance with a predetermined threshold; determine a difference signal between the first OFDM signal and the clipped first OFDM signal; generate a second set of sub-carrier values based on a Fourier Transform (FT) of the difference signal; determine a particular data symbol for inclusion in the second group of data symbols based at least partly on the second set of sub-carrier values; include the determined data symbol in the second group of data symbols; and exclude the determined data symbol from the first group of data symbols. These operations may be repeated in a next iteration, in which case the first group of data symbols may include one less data symbol and the second group of data symbols may include one more data symbol.

As a non-limiting example of determination of the particular data symbol for inclusion in the second group of data symbols, at each iteration, the wireless device 100 may determine a candidate group of data symbols based on magnitudes of the second set of sub-carrier values (such as a predetermined number of the plurality of data symbols corresponding to sub-carrier magnitudes in a highest range of sorted magnitudes). For each data symbol of the candidate group, the wireless device 100 may perform the following operations: determine a third set of sub-carrier values (wherein the value of the sub-carrier mapped to the data symbol of the candidate group is set to zero, and wherein values of other sub-carriers are set to corresponding values of the first set of sub-carrier values); determine a candidate OFDM signal based on an inverse FT of the third set of sub-carrier values; and determine a peak power metric for the data symbol of the candidate group based on a maximum magnitude of the candidate OFDM signal; and determine the particular data symbol for inclusion in the second group of data symbols as the data symbol of the candidate group of minimum peak power metric.

In some cases, the above algorithm may be reduced in complexity using any suitable technique. For instance, for at least a portion of the iterations, the wireless device 100 may: determine multiple data symbols for inclusion in the second group of data symbols based at least partly on the second set of sub-carrier values; and include the determined data symbols in the second group of data symbols and exclude the determined data symbols from the first group of data symbols.

Figure 8:
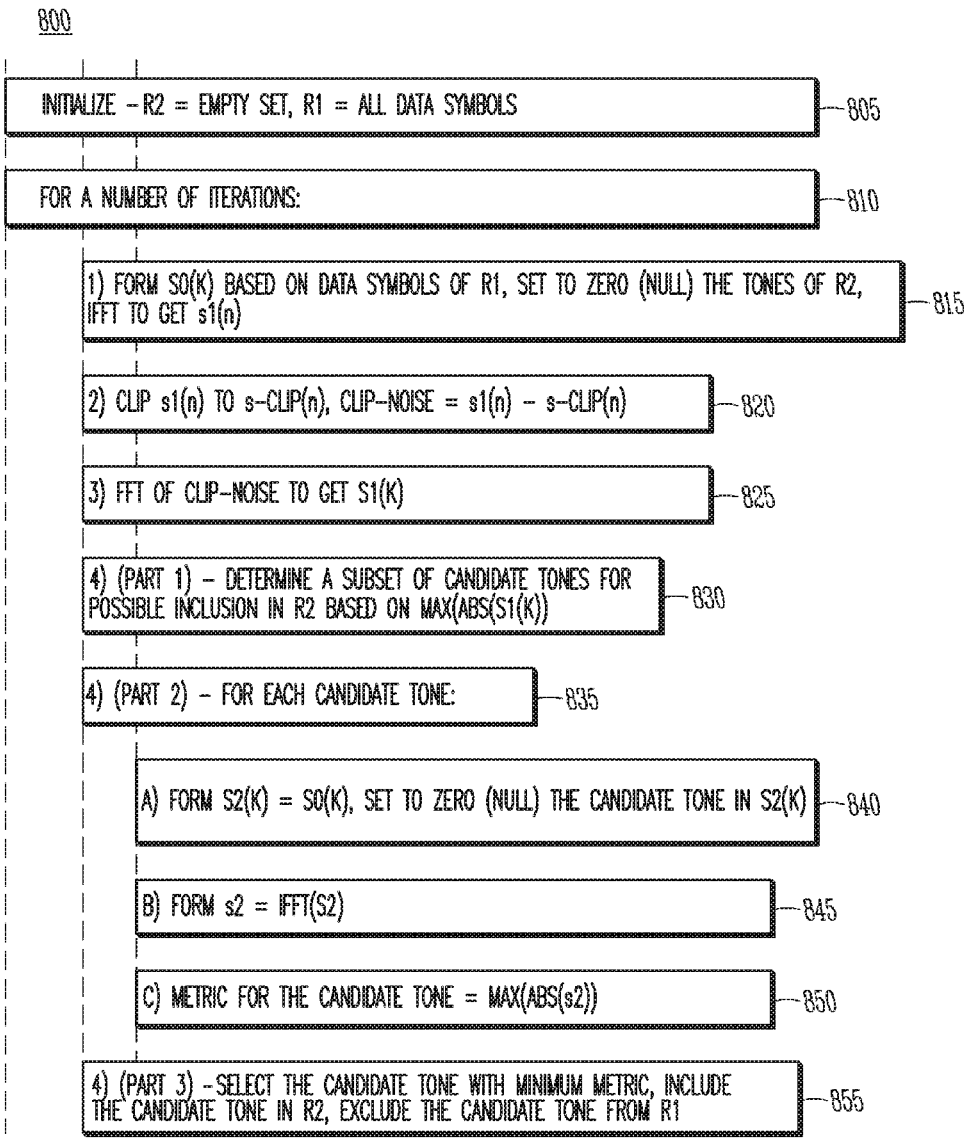
FIG. 8 illustrates example operations that may be performed in accordance with some aspects of present disclosure.

FIG. 8 illustrates example operations that may be performed in accordance with some aspects of present disclosure. One or more of the operations shown in FIG. 8 may be performed as part of the division of the plurality of data symbols into the first and second groups of data symbols. One or more of the operations may be similar to one or more operations described in previous examples, although the scope of aspects of present disclosure is not limited in this respect. The operations of FIG. 8 are shown as pseudo-code, and it is understood that any suitable techniques may be used to perform the operations shown.

The first group of data symbols (labeled as R1) and the second group of data symbols (labeled as R2) may be initialized as shown at 805. For a predetermined number of iterations (as indicated by 810), the current groups R1 and R2 may be used for the operations 815-850, and operation 855 may be performed to move one data symbol (tone) from R1 to R2. The set of operations 815-855 may be repeated for each of the predetermined number of iterations. After the number of iterations has completed, the algorithm may be complete, and the final value of R1 and R2 may be the first and second groups of the data symbols.

It should be noted that the division of the plurality of data symbols into the first and second groups of data symbols may be performed differently during different OFDM symbol periods. As an example, a first plurality of data symbols mapped for an OFDM transmission during a first OFDM symbol period may be divided in accordance with a first division. A second plurality of data symbols mapped for an OFDM transmission during a second OFDM symbol period may be divided in accordance with a second division that may be different from the first division.

Returning to the method 600, at operation 635, the wireless device 100 may generate a first OFDM signal from the first group of data symbols for amplification by the first PA. At operation 640, the wireless device 100 may generate a second OFDM signal from the second group of data symbols for amplification by a second PA.

At operation 645, when a modulation size of the data symbols is below a predetermined modulation size threshold, the wireless device 100 may generate a composite OFDM signal based on the plurality of data symbols (first and second groups of data symbols, before the division) for transmission by a second. PA. In some aspects of present disclosure, the division of the plurality of data symbols into the first and second groups of data symbols for amplification by the first and second PAs may be performed when a modulation size and/or modulation and coding scheme (MCS) is relatively high. When the modulation size and/or MCS is relatively low, the plurality of data symbols (before division into the first and second groups of data symbols) may be amplified by the second PA. As an example, a single amplification of a single group of data symbols may be used for low modulation size and/or low MCS, and amplification by the two PAs on the two groups of data symbols may be used for high modulation size and/or high MCS. For instance, quadrature amplitude modulation (QAM) of 16 levels or 64 levels may be a high modulation size. Examples of low modulation size may include binary phase shift keying (BPSK), which has two levels, and/or quadrature phase shift keying (QPSK), which has four levels. This example is not limiting, however, as any suitable types/sizes of modulation may be considered as high modulation size or low modulation size. For instance, modulation sizes of 64 or below (such as for 64-QAM, 16-QAM, QPSK and/or BPSK) may be considered as low modulation sizes, and QAM modulation types of size higher than 64 (such as 256 and/or 1024) may be considered as high modulation sizes.

It should be noted that aspects of present disclosure are not limited to usage of the modulation size to determine whether the composite signal (based on the plurality of data symbols before and/or without the division into the first and second groups of data symbols) is to be transmitted by one PA or whether the first and second OFDM signals are to be transmitted by the first and second PAs. One or more other criteria may be used in addition to or instead of the modulation size. Example criteria may include, but are not limited to PAPR of the first and/or second and/or composite OFDM signal, output power of the first and/or second and/or composite OFDM signal and/or other criteria.

It should be noted that operation 645 may not necessarily be included in some aspects of present disclosure. That is, the division into the first and second groups of data symbols and amplification by the first and second PAs may be performed regardless of the modulation type and/or MCS, in some aspects of present disclosure.

At operation 650, one or more signals, such as the first OFDM signal, second OFDM signal, composite OFDM signal and/or other signal may be up-converted to the RF range for amplification. At operation 655, an amplified signal and/or combined signal may be transmitted by the wireless device 100.

Figure 9:
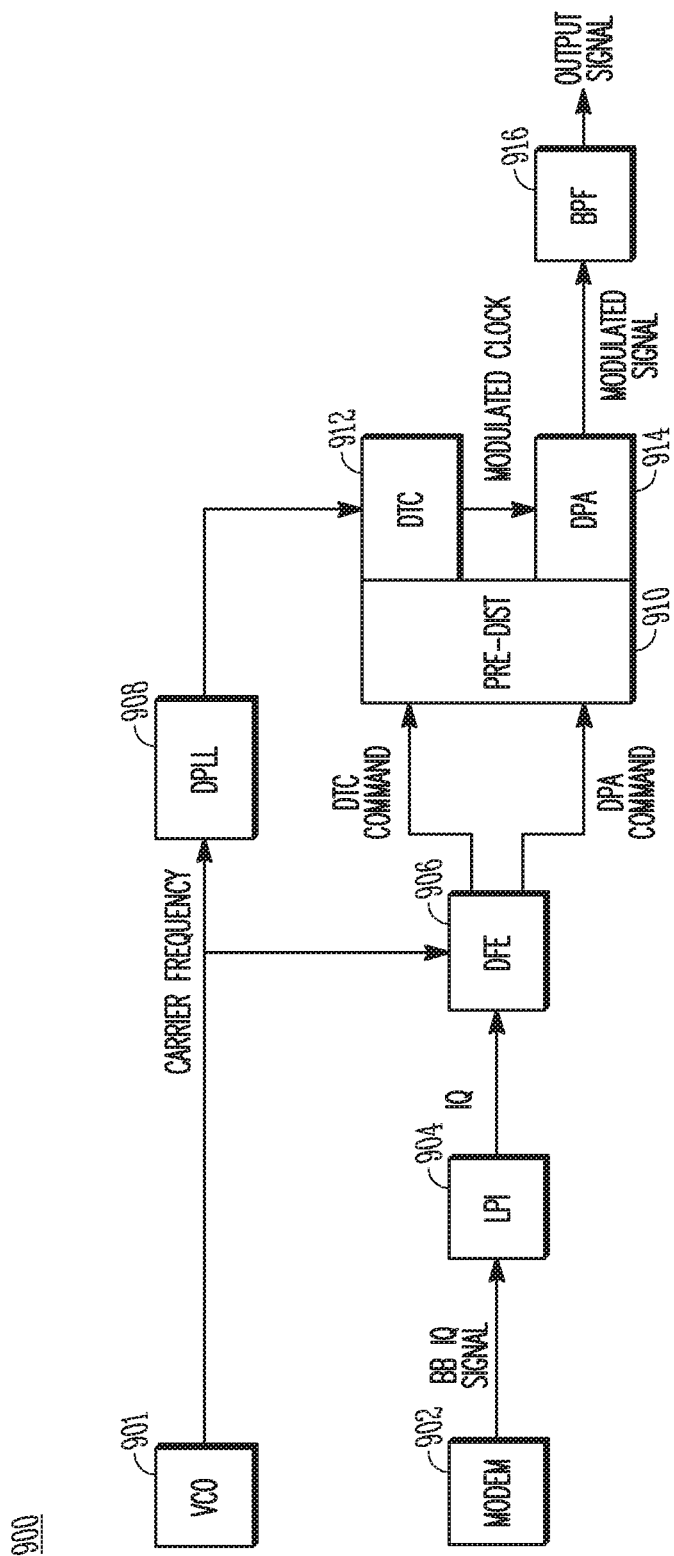
FIG. 9 illustrates a Digital Polar Transmitter (DTx) in accordance with some aspects of present disclosure.

FIG. 9 illustrates a Digital Polar Transmitter (DTx) in accordance with some aspects of present disclosure. The various elements described as part of the DTx described may be implemented, for example, in hardware and connected on a substrate or printed circuit board in a communication device and/or other device.

The DTx 900 may enable modulation data to be represented by amplitude and phase, rather by real and imaginary (IQ) components. As shown, the DTx 900 may include a modem 902 that provides an IQ signal. The signal may be supplied from the modem 902 at baseband. In some aspects of present disclosure, the baseband IQ signal may be at 640 MHz.

The baseband IQ signal may be provided to a linear phase interpolator (LPI) 904. The LPI 904 may interpolate the baseband IQ signal, taking samples at a predetermined rate. In some aspects of present disclosure, the LPI 904 may have a 2.56 GHz sampling rate such that an IQ output of the LPI 904 is 2.56 GHz.

The output from the LPI 904 may be supplied to a digital front end (DFE) 906. The DFE 906 may also be supplied with a carrier frequency signal, which may be from, for example, the 800 MHz band to any of the 5G bands of up to about 60 GHz. The carrier frequency may be supplied in a local oscillator (LO) signal from a voltage controlled oscillator (VCO) 901. The VCO 901 may provide the carrier frequency signal to modules in both the transmit and receive chain.

The DFE 906 may generate digital commands (code words) from the complex baseband data samples, that is at the carrier frequency based on the interpolated values from the LPI 904. The code words may include a digital-to-time converter (DTC) code word and a digital power amplifier (DPA) code word. The DTC code word and DPA code word may be provided respectively to a digitally controlled edge interpolator (DCEI) digital to time converter (DTC) 912 and DPA 914.

As described previously, in some aspects of present disclosure, one or more OFDM signals may be sent to one or more power amplifiers (PA) for amplification. Any suitable type of PAs may be used. In a non-limiting example, one or more DPAs 914 as shown in FIG. 9 may be used. The DPA 914 may be a class D digital switched combiner, switched cap power amplifier that converts the amplitude digital data directly to signal power to provide amplitude modulation. The class D DPA 914 may exhibit more than 40% improved efficiency compared to an analog class AB PA. The DTC 912 may convert the phase digital data to phase modulation (edge delay) of the LO signal from the DPLL 908.

In some aspects of present disclosure, as shown in FIG. 9, a DTC code word and DPA code word may be provided through a pre-distorter 910 respectively to DTC 912 and DPA 914. The pre-distorter 910 may be used to compensate for non-idealities in the resulting output signal from the DTx 900 when different code words are used. This may be caused as different code words may produce output signals that do not vary as expected; incrementing the code word from a first value to a second value may, for example, alter the output signal in a particular manner, while incrementing the code word again by the same amount from the second value to a third value may alter the output signal in a manner slightly different from the particular manner; the resulting differences may be non-linear or non-ideal. The variations may be due, for example, to manufacturing and/or thermal deviations of the circuitry within the DTC 912 and/or DPA 914. The pre-distorter 910 may be used to account for such a variation, which may be determined via a calibration or training session prior to the communication device being provided to an end user and perhaps periodically during use by an end user.

In addition to the compensated signal being supplied to the DTC 912, timing information is also provided. More specifically, the local oscillator signal is supplied to a digital phase lock loop (DPLL) 908. The output from the DPLL 908 is essentially a clock signal, which has consistent phases with the VCO signal, supplied to the DTC 912. The DTC 912 provides a modulated clock signal to the DPA 914. The DPA codeword indicates the amplitude and phase of the signal and the DTC 912 indicates to the DPA 914 when the next DPA codeword is to be used. This permits the DPA 914 to provide a series of samples modulated at the carrier frequency as an RF modulated signal as an output. The modulated signal from the DPA 914, which is a square wave, is then supplied to a bandpass filter (BPF) 916 from which the output signal of the DTx 900 is provided. The BPF 916 may remove frequencies outside of the desired bandwidth and provide an analog output to an antenna.

A desired modulated signal Y(t) to be provided from the DTx may be given by $Y(t)=A(t)*\cos(2*pi*Fc*t+theta(t))$, in which A(t) and theta(t) are the amplitude and phase, respectively, and Fc is the carrier frequency. As a non-limiting example, the carrier frequency may be from 800 MHz to 60 GHz or higher.

In Example 1, an apparatus of a wireless device may comprise memory. The apparatus may further comprise processing circuitry. The processing circuitry may be configured to map a plurality of data symbols to sub-carriers for a multiplexed transmission. The processing circuitry may be further configured to generate a composite multiplexed signal from the plurality of data symbols. The processing circuitry may be further configured to divide the plurality of data symbols into a first group of data symbols and a second group of data symbols based at least partly on the composite multiplexed signal. The processing circuitry may be further configured to generate a first multiplexed signal from the first group of data symbols for amplification by a first power amplifier. The processing circuitry may be further configured to generate a second multiplexed OFDM signal from the second group of data symbols for amplification by a second power amplifier. The first and second groups of data symbols may provide a lower power ratio of the first multiplexed signal than the composite multiplexed signal.

In Example 2, the subject matter of Example 1, wherein the multiplexed transmission may be an orthogonal frequency division multiplexing (OFDM) transmission, the first multiplexed signal may be a first OFDM signal, the second multiplexed signal may be a second OFDM signal, and the composite multiplexed signal may be a composite OFDM signal. The power ratio may be a peak-to-average power ratio (PAPR).

In Example 3, the subject matter of one or any combination of Examples 1-2, wherein the multiplexed transmission may be a single-carrier frequency division multiple access (SC-FDMA) transmission, the first multiplexed signal may be a first SC-FDMA signal, the second multiplexed signal may be a second SC-FDMA signal, and the composite multiplexed signal may be a composite SC-FDMA signal. The power ratio may be a peak-to-average power ratio (PAPR).

In Example 4, the subject matter of one or any combination of Examples 1-3, wherein the processing circuitry may be further configured to clip the composite multiplexed signal based on a predetermined threshold. The processing circuitry may be further configured to determine a difference signal between the composite multiplexed signal and the clipped composite multiplexed signal. The processing circuitry may be further configured to determine sub-carrier magnitudes of the difference signal based on a Fourier Transform (FT) of the difference signal. The processing circuitry may be further configured to divide the plurality of data symbols into the first and second groups of data symbols based on the sub-carrier magnitudes of the difference signal.

In Example 5, the subject matter of one or any combination of Examples 1-4, wherein the second group of data symbols may include a predetermined number of the plurality of data symbols. The first group of data symbols may include data symbols different from the second group. The plurality of data symbols of the first group may be mapped to a first group of sub-carriers and the plurality of data symbols of the second group may be mapped to a second group of sub-carriers. The sub-carrier magnitudes of the second group of sub-carriers may be higher than the sub-carrier magnitudes of the first group of sub-carriers.

In Example 6, the subject matter of one or any combination of Examples 1-5, wherein dividing the plurality of data symbols into the first and second groups of data symbols may provide variable sizes of the first and second groups.

In Example 7, the subject matter of one or any combination of Examples 1-6, wherein the processing circuitry may be further configured to initialize the second group of data symbols to an empty group. The processing circuitry may be further configured to initialize the first group of data symbols to include the plurality of data symbols. The processing circuitry may be further configured to, for a predetermined number of iterations: generate a first set of sub-carrier values, wherein values of the sub-carriers mapped to the plurality of data symbols of the second group are set to zero and values of the sub-carriers mapped to the plurality of data symbols of the first group are set to the corresponding data symbols; generate a first multiplexed signal based on the first set of sub-carrier values; clip the first multiplexed signal based on a predetermined threshold; determine a difference signal between the first multiplexed signal and the clipped first multiplexed signal; generate a second set of sub-carrier values based on a Fourier Transform (FT) of the difference signal; determine a particular data symbol for inclusion in the second group based at least partly on the second set of sub-carrier values; and include the determined data symbol in the second group and exclude the determined data symbol from the first group.

In Example 8, the subject matter of one or any combination of Examples 1-7, wherein the processing circuitry may be further configured to, for the predetermined number of iterations: determine a candidate group of data symbols based on magnitudes of the second set of sub-carrier values. The processing circuitry may be further configured to, for the predetermined number of iterations, for each data symbol of the candidate group: determine a third set of sub-carrier values, wherein the value of the sub-carrier mapped to the data symbol of the candidate group is set to zero, and wherein values of other sub-carriers are set to corresponding values of the first set of sub-carrier values; determine a candidate multiplexed signal based on an inverse FT of the third set of sub-carrier values; and determine a peak power metric for the data symbol of the candidate group based on a maximum magnitude of the candidate multiplexed signal. The processing circuitry may be further configured to, for the predetermined number of iterations, determine the particular data symbol for inclusion in the second group as the data symbol of the candidate group of minimum peak power metric.

In Example 9, the subject matter of one or any combination of Examples 1-8, wherein the processing circuitry may be further configured to, for at least a portion of the iterations: determine multiple data symbols for inclusion in the second group based at least partly on the second set of sub-carrier values; and include the determined data symbols in the second group and exclude the determined data symbols from the first group.

In Example 10, the subject matter of one or any combination of Examples 1-9, wherein the processing circuitry may be further configured to map the plurality of data symbols to the sub-carriers in accordance with a predetermined mapping. The processing circuitry may be further configured to set values of the sub-carriers to which the data symbols of the second group are mapped to zero to generate the first multiplexed signal. The processing circuitry may be further configured to set values of the sub-carriers to which the data symbols of the first group are mapped to zero to generate the second multiplexed signal.

In Example 11, the subject matter of one or any combination of Examples 1-10, wherein the division of the data symbols into the first and second groups may reduce a sum of power consumptions of the first power amplifier and the second power amplifier in comparison to a power consumption based on amplification of the composite multiplexed signal.

In Example 12, the subject matter of one or any combination of Examples 1-11, wherein the plurality of data symbols may be a first plurality of data symbols divided in accordance with a first division, and the multiplexed transmission may be a first multiplexed transmission of a first multiplexed symbol period. The processing circuitry may be further configured to map a second plurality of data symbols to the sub-carriers for a second multiplexed transmission during a second multiplexed symbol period. The processing circuitry may be further configured to divide the second data symbols in accordance with a second division different from the first division.

In Example 13, the subject matter of one or any combination of Examples 1-12, wherein the processing circuitry may be further configured to, if a modulation size of the data symbols is greater than or equal to a modulation size threshold: divide the plurality of data symbols into the first and second groups of data symbols; generate the first multiplexed signal for the amplification by the first power amplifier; and generate the second multiplexed signal for the amplification by the second power amplifier. The processing circuitry may be further configured to, if the modulation size of the data symbols is less than the modulation size threshold, generate the composite multiplexed signal for amplification by the second power amplifier.

In Example 14, the subject matter of one or any combination of Examples 1-13, wherein the first and second multiplexed signals may be baseband signals generated for the amplifications by the first and second power amplifiers in a radio frequency (RF) range.

In Example 15, the subject matter of one or any combination of Examples 1-14, wherein the apparatus may further comprise the first power amplifier, the second power amplifier, and a combiner to combine output signals from the first and second power amplifier.

In Example 16, the subject matter of one or any combination of Examples 1-15, wherein the processing circuitry may comprise a baseband processor to map the plurality of data symbols, divide the plurality of data symbols, and generate the first multiplexed signal, second multiplexed signal, and composite OFDM multiplexed.

In Example 17, a non-transitory computer-readable storage medium may store instructions for execution by one or more processors to perform operations to generate signals for one or more power amplifiers. The operations may configure the one or more processors to map a plurality of data symbols to sub-carriers for an orthogonal frequency division multiplexing (OFDM) transmission. The operations may further configure the one or more processors to generate a composite OFDM signal based on the plurality of data symbols. The operations may further configure the one or more processors to clip the composite OFDM signal in accordance with a predetermined threshold. The operations may further configure the one or more processors to determine a difference signal between the composite OFDM signal and the clipped composite OFDM signal. The operations may further configure the one or more processors to determine sub-carrier magnitudes of the difference signal based on a Fourier Transform (FT) of the difference signal. The operations may further configure the one or more processors to, based on the sub-carrier magnitudes of the difference signal, divide the plurality of data symbols into a first group of data symbols and a second group of data symbols for generation of a first OFDM signal for amplification by a first power amplifier and a second OFDM signal for amplification by a second power amplifier.

In Example 18, the subject matter of Example 17, wherein the operations may further configure the one or more processors to divide the plurality of data symbols into the first and second groups of data symbols in accordance with a peak-to-average power ration (PAPR) criterion wherein a PAPR of the first OFDM signal is lower than a PAPR of the second OFDM signal and is lower than a PAPR of the composite OFDM signal. Dividing the plurality of data symbols into the first and second groups of data symbols may reduce a combined power consumption of the first and second power amplifiers in comparison to a reference power consumption for amplification of the composite OFDM signal.

In Example 19, the subject matter of one or any combination of Examples 17-18, wherein the operations may further configure the one or more processors to select, for the second group of data symbols, a predetermined number of the plurality of data symbols for which the sub-carrier magnitudes are in a highest range of the sub-carrier magnitudes sorted in an ascending order.

In Example 20, a method of signal generation may comprise mapping a plurality of data symbols to sub-carriers for an orthogonal frequency division multiplexing (OFDM) transmission. The method may further comprise dividing the plurality of data symbols into a first group of data symbols and a second group of data symbols. The method may further comprise generating a first OFDM signal from the first group of data symbols for amplification by a first power amplifier. The method may further comprise generating a second OFDM signal from the second group of data symbols for amplification by a second power amplifier. The data symbols of the first and second groups may be selected to provide a lower power ratio of the first OFDM signal than the second OFDM signal.

In Example 21, the subject matter of Example 20, wherein the method may further comprise clipping a composite OFDM signal, generated from the first and second groups of data symbols, based on a predetermined threshold. The method may further comprise determining a difference signal between the composite OFDM signal and the clipped composite OFDM signal. The method may further comprise determining sub-carrier magnitudes of the difference signal based on a Fourier Transform (FT) of the difference signal. The method may further comprise dividing the data symbols into the first and second groups of data symbols based at least partly on the sub-carrier magnitudes of the difference signal.

In Example 22, the subject matter of one or any combination of Examples 20-21, wherein the power ratio may be a peak-to-average power ratio (PAPR).

In Example 23, the subject matter of one or any combination of Examples 20-22, wherein the method may further comprise, for multiple candidate divisions of the data symbols: dividing the plurality of data symbols into a candidate first group of data symbols and a candidate second group of data symbols; and determining a candidate first PAPR of a candidate first OFDM signal based on the candidate first group of data symbols. The method may further comprise selecting the first and second groups of data symbols as the candidate first and second groups of data symbols for which the candidate first PAPR is minimized.

In Example 24, an apparatus of a wireless device may comprise means for mapping a plurality of data symbols to sub-carriers for an orthogonal frequency division multiplexing (OFDM) transmission. The apparatus may further comprise means for generating a composite OFDM signal based on the plurality of data symbols. The apparatus may further comprise means for clipping the composite OFDM signal in accordance with a predetermined threshold. The apparatus may further comprise means for determining a difference signal between the composite OFDM signal and the clipped composite OFDM signal. The apparatus may further comprise means for determining sub-carrier magnitudes of the difference signal based on a Fourier Transform (FT) of the difference signal. The apparatus may further comprise means for, based on the sub-carrier magnitudes of the difference signal, dividing the plurality of data symbols into a first group of data symbols and a second group of data symbols for generation of a first OFDM signal for amplification by a first power amplifier and a second OFDM signal for amplification by a second power amplifier.

In Example 25, the subject matter of Example 24, wherein the apparatus may further comprise means for dividing the plurality of data symbols into the first and second groups of data symbols in accordance with a peak-to-average power ration (PAPR) criterion wherein a PAPR of the first OFDM signal is lower than a PAPR of the second OFDM signal and is lower than a PAPR of the composite OFDM signal. Dividing the plurality of data symbols into the first and second groups of data symbols may reduce a combined power consumption of the first and second power amplifiers in comparison to a reference power consumption for amplification of the composite OFDM signal.

In Example 26, the subject matter of one or any combination of Examples 24-25, wherein the apparatus may further comprise means for selecting, for the second group of data symbols, a predetermined number of the plurality of data symbols for which the sub-carrier magnitudes are in a highest range of the sub-carrier magnitudes sorted in an ascending order.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising:

memory; and
processing circuitry, the processing circuitry configured to:
   map a plurality of data symbols to sub-carriers for a multiplexed transmission;
   generate a composite multiplexed signal from the plurality of data symbols;
   clip the composite multiplexed signal based on a predetermined threshold;
   determine a difference signal between the composite multiplexed signal and the clipped composite multiplexed signal;
   determine sub-carrier magnitudes of the difference signal based on a Fourier Transform (FT) of the difference signal;
   divide the plurality of data symbols into a first group of data symbols and a second group of data symbols based on the sub-carrier magnitudes of the difference signal;
   generate a first multiplexed signal from the first group of data symbols for amplification by a first power amplifier; and
   generate a second multiplexed signal from the second group of data symbols for amplification by a second power amplifier, wherein selection of the first and second groups of data symbols from the plurality of data symbols is made to provide a lower power ratio of the first multiplexed signal than the composite multiplexed signal, the composite multiplexed signal generated from data symbols of both the first group and the second group.

2. The apparatus according to claim 1, wherein:
the multiplexed transmission is an orthogonal frequency division multiplexing (OFDM) transmission,
the first multiplexed signal is a first OFDM signal, the second multiplexed signal is a second OFDM signal, and the composite multiplexed signal is a composite OFDM signal, and
the power ratio is a peak-to-average power ratio (PAPR).

3. The apparatus according to claim 1, wherein:
the multiplexed transmission is a single-carrier frequency division multiple access (SC-FDMA) transmission,
the first multiplexed signal is a first SC-FDMA signal, the second multiplexed signal is a second SC-FDMA signal, and the composite multiplexed signal is a composite SC-FDMA signal, and
the power ratio is a peak-to-average power ratio (PAPR).

4. The apparatus according to claim 1, wherein:
the second group of data symbols includes a predetermined number of the plurality of data symbols,
the first group of data symbols includes data symbols different from the second group,
the plurality of data symbols of the first group are mapped to a first group of sub-carriers and the plurality of data symbols of the second group are mapped to a second group of sub-carriers,
wherein the sub-carrier magnitudes of the second group of sub-carriers are higher than the sub-carrier magnitudes of the first group of sub-carriers.

5. The apparatus according to claim 1, wherein dividing the plurality of data symbols into the first and second groups of data symbols provides variable sizes of the first and second groups.

6. An apparatus of a wireless device, the apparatus comprising:
memory; and
processing circuitry, the processing circuitry configured to:
   map a plurality of data symbols to sub-carriers for a multiplexed transmission;
   generate a composite multiplexed signal from the plurality of data symbols;
   divide the plurality of data symbols into a first group of data symbols and a second group of data symbols based at least partly on the composite multiplexed signal;
   generate a first multiplexed signal from the first group of data symbols for amplification by a first power amplifier; and
   generate a second multiplexed signal from the second group of data symbols for amplification by a second power amplifier, wherein the first and second groups of data symbols provide a lower power ratio of the first multiplexed signal than the composite multiplexed signal, the processing circuitry further configured to:
      initialize the second group of data symbols to an empty group;
      initialize the first group of data symbols to include the plurality of data symbols;
      for a predetermined number of iterations:
         generate a first set of sub-carrier values, wherein values of the sub-carriers mapped to the plurality of data symbols of the second group are set to zero and values of the sub-carriers mapped to the plurality of data symbols of the first group are set to the corresponding data symbols;
         generate a first multiplexed signal based on the first set of sub-carrier values;
         clip the first multiplexed signal based on a predetermined threshold;
         determine a difference signal between the first multiplexed signal and the clipped first multiplexed signal;
         generate a second set of sub-carrier values based on a Fourier Transform (FT) of the difference signal;
         determine a particular data symbol for inclusion in the second group based at least partly on the second set of sub-carrier values; and
         include the determined data symbol in the second group and exclude the determined data symbol from the first group.

7. The apparatus according to claim 6, the processing circuitry further configured to:
for the predetermined number of iterations:
   determine a candidate group of data symbols based on magnitudes of the second set of sub-carrier values;
   for each data symbol of the candidate group:
      determine a third set of sub-carrier values, wherein the value of the sub-carrier mapped to the data symbol of the candidate group is set to zero, and wherein values of other sub-carriers are set to corresponding values of the first set of sub-carrier values;
      determine a candidate multiplexed signal based on an inverse FT of the third set of sub-carrier values; and
      determine a peak power metric for the data symbol of the candidate group based on a maximum magnitude of the candidate multiplexed signal; and determine the particular data symbol for inclusion in the second group as the data symbol of the candidate group of minimum peak power metric.

8. The apparatus according to claim 7, the processing circuitry further configured to:
for at least a portion of the iterations:
determine multiple data symbols for inclusion in the second group based at least partly on the second set of sub-carrier values; and
include the determined data symbols in the second group and exclude the determined data symbols from the first group.

9. An apparatus of a wireless device, the apparatus comprising:
memory; and
processing circuitry, the processing circuitry configured to:
map a plurality of data symbols to sub-carriers for a multiplexed transmission;
generate a composite multiplexed signal from the plurality of data symbols;
divide the plurality of data symbols into a first group of data symbols and a second group of data symbols based at least partly on the composite multiplexed signal;
generate a first multiplexed signal from the first group of data symbols for amplification by a first power amplifier; and
generate a second multiplexed signal from the second group of data symbols for amplification by a second power amplifier, wherein the first and second groups of data symbols provide a lower power ratio of the first multiplexed signal than the composite multiplexed signal, the processing circuitry further configured to:
map the plurality of data symbols to the sub-carriers in accordance with a predetermined mapping;
set values of the sub-carriers to which the data symbols of the second group are mapped to zero to generate the first multiplexed signal; and
set values of the sub-carriers to which the data symbols of the first group are mapped to zero to generate the second multiplexed signal.

10. The apparatus according to claim 1, wherein:
the division of the data symbols into the first and second groups reduces a sum of power consumptions of the first power amplifier and the second power amplifier in comparison to a power consumption based on amplification of the composite multiplexed signal.

11. The apparatus according to claim 1, wherein:
the plurality of data symbols is a first plurality of data symbols divided in accordance with a first division, and the multiplexed transmission is a first multiplexed transmission of a first multiplexed symbol period,
the processing circuitry is further configured to:
map a second plurality of data symbols to the sub-carriers for a second multiplexed transmission during a second multiplexed symbol period; and
divide the second data symbols in accordance with a second division different from the first division.

12. An apparatus of a wireless device, the apparatus comprising:
memory; and
processing circuitry, the processing circuitry configured to:
map a plurality of data symbols to sub-carriers for a multiplexed transmission;
generate a composite multiplexed signal from the plurality of data symbols;
divide the plurality of data symbols into a first group of data symbols and a second group of data symbols based at least partly on the composite multiplexed signal;
generate a first multiplexed signal from the first group of data symbols for amplification by a first power amplifier; and
generate a second multiplexed signal from the second group of data symbols for amplification by a second power amplifier, wherein the first and second groups of data symbols provide a lower power ratio of the first multiplexed signal than the composite multiplexed signal, the processing circuitry further configured to:
when a modulation size of the data symbols is greater than or equal to a modulation size threshold:
divide the plurality of data symbols into the first and second groups of data symbols;
generate the first multiplexed signal for the amplification by the first power amplifier; and
generate the second multiplexed signal for the amplification by the second power amplifier, and
when the modulation size of the data symbols is less than the modulation size threshold:
generate the composite multiplexed signal for amplification by the second power amplifier.

13. The apparatus according to claim 1, wherein the first and second multiplexed signals are baseband signals generated for the amplifications by the first and second power amplifiers in a radio frequency (RF) range.

14. The apparatus according to claim 1, wherein the apparatus further comprises the first power amplifier, the second power amplifier, and a combiner to combine output signals from the first and second power amplifier.

15. The apparatus according to claim 1, wherein the processing circuitry comprises a baseband processor to map the plurality of data symbols, divide the plurality of data symbols, and generate the first multiplexed signal, the second multiplexed signal, and the composite multiplexed signal.

16. A non-transitory computer-readable storage medium that stores instructions for execution by one or more processors to perform operations to generate signals for one or more power amplifiers, the operations to configure the one or more processors to:
map a plurality of data symbols to sub-carriers for an orthogonal frequency division multiplexing (OFDM) transmission;
generate a composite OFDM signal based on the plurality of data symbols;
clip the composite OFDM signal in accordance with a predetermined threshold;
determine a difference signal between the composite OFDM signal and the clipped composite OFDM signal;
determine sub-carrier magnitudes of the difference signal based on a Fourier Transform (FT) of the difference signal; and
based on the sub-carrier magnitudes of the difference signal, divide the plurality of data symbols into a first group of data symbols and a second group of data symbols for generation of a first OFDM signal for amplification by a first power amplifier and a second OFDM signal for amplification by a second power amplifier, wherein selection of the first and second groups of data symbols from the plurality of data symbols is made in accordance with a peak-to-average power ratio (PAPR) criterion in which a PAPR of the first OFDM signal is lower than a PAPR of the second OFDM signal and is lower than a PAPR of the composite OFDM signal.

17. The non-transitory computer-readable storage medium according to claim 16, the operations to further configure the one or more processors to:
divide the plurality of data symbols into the first and second groups of data symbols, such that dividing the plurality of data symbols into the first and second groups of data symbols reduces a combined power consumption of the first and second power amplifiers in comparison to a reference power consumption for amplification of the composite OFDM signal.

18. The non-transitory computer-readable storage medium according to claim 16, the operations to further configure the one or more processors to select, for the second group of data symbols, a predetermined number of the plurality of data symbols for which the sub-carrier magnitudes are in a highest range of the sub-carrier magnitudes sorted in an ascending order.

19. A method of signal generation, the method comprising:
mapping a plurality of data symbols to sub-carriers for an orthogonal frequency division multiplexing (OFDM) transmission;
generating a composite OFDM signal from the plurality of data symbols;
clipping the composite OFDM signal based on a predetermined threshold;
determining a difference signal between the composite OFDM signal and the clipped composite OFDM signal;
determining sub-carrier magnitudes of the difference signal based on a Fourier Transform (FT) of the difference signal; and
dividing the data symbols into the first and second groups of data symbols based at least partly on the sub-carrier magnitudes of the difference signal;
generating a first OFDM signal from the first group of data symbols for amplification by a first power amplifier; and
generating a second OFDM signal from the second group of data symbols for amplification by a second power amplifier,
wherein the data symbols of the first and second groups are selected to provide a lower power ratio of the first OFDM signal than the second OFDM signal and a lower power ratio of the first OFDM signal than a reference power ratio of a composite OFDM signal based on the first and second groups of data symbols.

20. The method according to claim 19, wherein the power ratio is a peak-to-average power ratio (PAPR).

21. The method according to claim 20, further comprising:
for multiple candidate divisions of the data symbols:
dividing the plurality of data symbols into a candidate first group of data symbols and a candidate second group of data symbols; and
determining a candidate first PAPR of a candidate first OFDM signal based on the candidate first group of data symbols; and
selecting the first and second groups of data symbols as the candidate first and second groups of data symbols for which the candidate first PAPR is minimized.

* * * * *

UNITED STATES PATENT AND TRADEMARK OFFICE
CERTIFICATE OF CORRECTION

PATENT NO. : 10,477,476 B2  
APPLICATION NO. : 15/280350  
DATED : November 12, 2019  
INVENTOR(S) : Kerner et al.

Page 1 of 1

It is certified that error appears in the above-identified patent and that said Letters Patent is hereby corrected as shown below:

In the Claims

Column 24, Line 25, Claim 12, delete "amplifier," and insert --amplifier;-- therefor Signed and Sealed this  
Ninth Day of June, 2020

Andrei Iancu  
*Director of the United States Patent and Trademark Office*